(12) United States Patent
Shiraishi et al.

(10) Patent No.: US 6,899,089 B2
(45) Date of Patent: May 31, 2005

(54) CONTROL APPARATUS FOR INTERNAL COMBUSTION ENGINE AND CONTROL METHOD FOR INTERNAL COMBUSTION ENGINE COMBUSTION METHOD FOR INTERNAL COMBUSTION ENGINE AND DIRECT INJECTION ENGINE

(75) Inventors: Takuya Shiraishi, Hitachinaka (JP); Toshiharu Nogi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/390,917

(22) Filed: Mar. 19, 2003

(65) Prior Publication Data
US 2004/0079322 A1 Apr. 29, 2004

(30) Foreign Application Priority Data
Oct. 29, 2002 (JP) ........................................ 2002-313601

(51) Int. Cl.[7] ............................ F02B 47/08; F02B 47/10
(52) U.S. Cl. ............. 123/533; 123/568.11; 123/568.14; 123/585
(58) Field of Search ................................ 123/533, 585, 123/568.11, 568.14, 90.15, 90.16

(56) References Cited

U.S. PATENT DOCUMENTS

| | | | | |
|---|---|---|---|---|
| 4,798,190 A | * | 1/1989 | Vaznaian et al. | 123/531 |
| 4,991,547 A | * | 2/1991 | Davis et al. | 123/568.14 |
| 5,081,969 A | * | 1/1992 | Long, III | 123/274 |
| 5,205,120 A | * | 4/1993 | Oblander et al. | 123/585 |
| 5,526,796 A | * | 6/1996 | Thring et al. | 123/531 |
| 5,906,183 A | | 5/1999 | Echtle et al. | |
| 6,085,712 A | | 7/2000 | Ma | |
| 6,178,956 B1 | * | 1/2001 | Steinmann et al. | 123/568.21 |
| 6,374,799 B1 | * | 4/2002 | Firey | 123/533 |
| 6,581,576 B1 | * | 6/2003 | Rousseau | 123/533 |
| 2002/0162544 A1 | * | 11/2002 | Cho et al. | 123/585 |
| 2004/0112307 A1 | * | 6/2004 | Allen | 123/27 R |

FOREIGN PATENT DOCUMENTS

EP    1 103 716 A2    5/2001

* cited by examiner

Primary Examiner—Erick Solis
(74) Attorney, Agent, or Firm—Crowell & Moring LLP (57) ABSTRACT

A gasoline engine is provided which is capable of introducing a large amount of EGR gas for performing homogeneous combustion and thus offering a good fuel economy. An external EGR mechanism or an internal EGR mechanism is used to introduce an EGR gas into a combustion chamber (a cylinder). A mixture of fresh air and fuel is thereafter directly injected from a mixture injection valve into the combustion chamber, thereby forming a region of said mixture in an area near an ignition plug. In addition, engine operating parameters are controlled in accordance with the amount of fresh air supplied into the combustion chamber (cylinder) after an intake valve has been closed. This makes possible homogeneous combustion using a large amount of EGR, which eventually increases fuel economy.

8 Claims, 11 Drawing Sheets

CONTROL APPARATUS FOR INTERNAL COMBUSTION ENGINE AND CONTROL METHOD FOR INTERNAL COMBUSTION ENGINE COMBUSTION METHOD FOR INTERNAL COMBUSTION ENGINE AND DIRECT INJECTION ENGINE

BACKGROUND OF THE INVENTION

The present invention relates to an internal combustion engine that directly injects gasoline into a combustion chamber (which is equivalent in meaning to a cylinder) for combustion, namely a direct injection type gasoline engine. More specifically, it relates to an improvement made on an internal combustion engine of this type involving homogeneous combustion.

Japanese Patent Laid-open No. Hei 9-280138 discloses a direct injection type gasoline engine in which, in a technique as the prior art, a mixture of EGR gas and fuel (gasoline) is formed outside a combustion chamber and is then directly injected into the combustion chamber. A technique as an invention is also described in the publication, in which a mixture of compressed air and fuel (gasoline) is formed outside the combustion chamber and is directly supplied into the combustion chamber.

Japanese Patent Laid-open No. 2000-97032 describes a direct injection type gasoline engine in which while air and EGR gas are mixed and the mixture is supplied into a combustion chamber, fuel (gasoline) is directly injected into the combustion chamber for combustion.
[Patent Literature 1]
  Japanese Patent Laid-open No. Hei 9-280138
[Patent Literature 2]
  Japanese Patent Laid-open No. 2000-97032

According to these prior art techniques, the EGR gas is mixed with fresh air or fuel outside the combustion chamber before the resultant mixture is supplied to the combustion chamber. Because of this arrangement, the amount of EGR gas to be introduced into the combustion chamber is restricted in a variety of ways, being limited to a relatively small amount.

If the amount of EGR gas is made large, on the other hand, the distribution of rich-to-lean air-fuel mixture ratios in the combustion chamber exhibits no reproducibility, resulting in unstable combustion performance.

SUMMARY OF THE INVENTION

It is therefore an object of the present invention to provide a direct injection type gasoline engine that is capable of stabilized combustion regardless of whether a large amount of EGR gas is introduced into the combustion chamber.

To achieve the foregoing object, an arrangement is provided according to the present invention, in which a mixture of fuel and fresh air is injected into the combustion chamber, into which EGR gas has been introduced.

A method embodying the present invention for achieving the foregoing object is that the mixture of fuel and fresh air is injected into the combustion chamber after the EGR gas has been introduced thereto.

More specifically, an EGR device, a fuel/fresh air mixing device, and a mixture injection device that directly supplies the mixture of fuel and fresh air into the combustion chamber are provided.

The fuel/fresh air mixing device and the mixture injection device may be separate from each other, or integrated together.

Either an external EGR or an internal EGR may be used for the EGR device.

If the internal EGR device is used, an intake valve and an exhaust valve are advantageously provided with a variable valve train.

Since fuel and fresh air are mixed together before being supplied into the combustion chamber, the amount of fresh air supplied into the combustion chamber does not represent only that of the fresh air drawn in through the intake valve. Parameters (for example, the amount of fuel supplied) of the engine is therefore corrected in accordance with the amount of this excess fresh air supplied to the combustion chamber or calculated in consideration of the same.

A sensor that measures the amount of fresh air supplied to the cylinder is designed so as to detect both the amount of fresh air supplied through the intake valve and that of fresh air supplied as the mixture with fuel.

Other features of the present invention will become apparent from descriptions of preferred embodiments of the present invention that follow.

A direct injection engine includes a mixture injection valve having a valve portion that can open to a combustion chamber of an engine, an air injection valve that injects compressed air into a mixing chamber of the mixture injection valve, a fuel injection valve that injects fuel in the mixing chamber, and a throttle valve that regulates the amount of air supplied to an intake valve of the engine. When air drawn into the engine is supplied only through the mixture injection valve, an air-fuel ratio of a mixture injected through the mixture injection valve is set to the stoichiometric air-fuel ratio. When air is also supplied through the intake valve, the air-fuel ratio of the mixture injected through the mixture injection valve is set to a level richer than the stoichiometric air-fuel ratio.

BRIEF DESCRIPTION OF THE DRAWINGS

Other objects and advantages of the invention will become apparent from the following description of embodiments with reference to the accompanying drawings in which:

FIG. 3, comprising

DETAILED DESCRIPTION OF THE PREFERRED EMBODIMENTS

Background of techniques relating to the present invention will be described in the following for reference.

There is a growing need for automotive and other engines to reduce fuel consumption from standpoints of global environmental conservation and energy saving. As a technique to meet that need in the field of the gasoline engine, direct injection engines that have a fuel injection point inside a combustion chamber of the engine have been put into practical use. The direct injection configuration permits stratified charge combustion with an air-fuel ratio of 40 or more, thus reducing a pump loss for an even lower fuel consumption.

There is, however, a large amount of oxygen left in exhaust gases during stratified charge combustion. A conventional problem, in which three-way catalysts used for purification of exhaust emissions are not effective enough to purify NOx, has remained unsolved. To solve this problem, a lean NOx catalyst that is capable of reducing NOx even in an oxygen ambience has been developed and widely used in current commercial applications of direct injection type gasoline engines. The lean NOx catalyst, however, exhibits a reduced purification efficiency when it has adsorbed a predetermined amount of NOx. It then becomes necessary to regenerate purification efficiency by supplying HC and other components from the engine. In actual applications, a rich spike control or the like is provided, in which the amount of fuel supplied to the engine is temporarily increased to enrich the air-fuel ratio. This control results in an excess amount of fuel being consumed. This means that the direct injection type gasoline engine offers a reduced fuel consumption effect, since this gasoline engine consumes an extra amount of fuel during the rich spike control, while reducing fuel consumption through stratified charge combustion. On top of that, equipping the engine with the lean NOx catalyst increases cost of the entire system, hindering dissemination of direct injection type gasoline engines.

An approach should therefore be taken toward examining ways to reduce exhaust emissions from the direct injection type gasoline engine. Two approaches may be possible from the viewpoint of reduced exhaust emissions of the direct injection type gasoline engine. One approach is a compression ignition engine system that can reduce NOx emitted therefrom. The other approach is an engine system provided with a three-way catalyst that purifies exhaust emissions from the engine. To purify exhaust emissions using the three-way catalyst, it is necessary to provide homogeneous combustion for the engine combustion state. A fuel consumption reduction effect through a reduction in pump loss cannot, however, be expected as that from stratified charge combustion or the like. There is therefore a need for a fuel consumption reduction technique for the direct injection type gasoline engine that performs homogeneous combustion.

There is known as the prior art for reducing fuel consumption in the gasoline engine that performs homogeneous combustion an EGR that introduces an inert gas or an exhaust gas into the combustion chamber and burns a mixture to which the inert gas has been added. In this case, the amount of fresh air drawn into the combustion chamber is reduced because of the exhaust gas introduced thereto (hereinafter referred to as the "EGR gas"). The throttle valve is therefore opened more widely in order to produce engine torque equivalent to that when there is no EGR gas involved. This reduces the pump loss, thus reducing fuel consumption. In addition, the introduction of the EGR gas into the combustion chamber increases the heat capacity of the gas in the combustion chamber. This keeps a combustion temperature low, thus offering an effect of a reduced amount of NOx produced.

The following condition, however, results when the EGR gas is introduced into the combustion chamber and mixed therein with fresh air. That is, although the air-fuel ratio of a mixture in relation to fresh air is set to 14.7 to effect homogeneous combustion, the air-fuel ratio is greater than 14.7 in terms of the ratio of a mixture of the EGR gas and fresh air. That is, the mixture is leaner, thus reducing ignitability and causing the engine to tend to misfire. Another problem involved is a greater cooling loss and a reduced thermal efficiency due to a combustion speed becoming slower. Although the EGR helps reduce fuel consumption and decrease the amount of NOx produced, the aforementioned problems impede introduction of a large amount of the EGR gas. The EGR is not therefore efficient enough as a fuel consumption reduction technique for the gasoline engine that performs homogeneous combustion.

The following is a summary of preferred embodiments of the present invention to be later detailed.

There is known as the prior art for reducing fuel consumption in the gasoline engine that performs homogeneous combustion, the EGR that introduces the exhaust gas into the combustion chamber and burns the mixture, to which the exhaust gas has been added. In this case, the amount of fresh air drawn into the combustion chamber is reduced because of the exhaust gas introduced thereto (hereinafter referred to as the EGR gas). The throttle valve is therefore opened more widely in order to produce engine torque equivalent to that when there is no EGR gas involved. This reduces the pump loss, thus reducing fuel consumption. In addition, the introduction of the EGR gas into the combustion chamber increases the heat capacity of the gas in the combustion chamber. This keeps a combustion temperature low, thus offering an effect of a reduced amount of NOx produced. The following condition, however, results when the EGR gas is introduced into the combustion chamber and mixed therein with fresh air. That is, although the air-fuel ratio of a mixture in relation to fresh air is set to 14.7 to effect homogeneous combustion, the air-fuel ratio is greater than 14.7 in terms of the ratio of a mixture of the EGR gas and fresh air. That is, the mixture is leaner, thus reducing ignitability and causing the engine to tend to misfire. Another problem involved is a greater cooling loss and a reduced thermal efficiency due to a combustion speed becoming slower. Although the EGR helps reduce fuel consumption and decrease the amount of NOx produced, the aforementioned problems impede introduction of a large amount of the EGR gas. The EGR is not therefore efficient enough as a fuel consumption reduction technique for the gasoline engine that performs homogeneous combustion.

The present invention has therefore been devised to solve the foregoing problems. It is an object of the present invention to provide a method for forming a mixture in a direct injection engine that allows a large amount of EGR gas to be burned. The invention accomplishes this task by introducing the EGR gas into the combustion chamber and then injecting the mixture formed in a mixing chamber of a mixture injection valve into the combustion chamber.

The present invention provides, as a specific means for achieving the foregoing object, a method for forming a mixture for a direct injection engine as configured as described in the following. The following components are provided: a mixture injection valve having a valve portion that can open to a combustion chamber of the direct injection engine; an air injection valve that injects compressed air into a mixing chamber of the mixture injection valve; a fuel injection valve that injects fuel; a throttle valve that regulates the amount of air supplied to an intake valve of the engine; and a communication passage that connects an exhaust passage and an intake passage of the engine. The communication passage provides communication between the throttle valve and the intake valve. With the combustion chamber filled with the exhaust gas introduced through the communication passage, the mixture formed in the mixing chamber within the mixture injection valve is injected through the valve portion. This allows an ignitable mixture to be formed in an area around an ignition plug of the engine.

Modes for carrying out the present invention will be enumerated in the following.

[Mode 1]

There are provided a mixture injection valve having a valve portion that can open to a combustion chamber, an air injection valve that injects compressed air into a mixing chamber of the mixture injection valve, a fuel injection valve that injects fuel into the mixing chamber of the mixture injection valve, a throttle valve that regulates the amount of air supplied to an intake valve of the engine, and a communication passage that connects an exhaust passage and an intake passage of the engine. The communication passage provides communication between the throttle valve and the intake valve. With the combustion chamber filled with the exhaust gas introduced through the communication passage, the mixture formed in the mixing chamber within the mixture injection valve is injected through the valve portion, thereby forming an ignitable mixture in an area around an ignition plug of the engine.

[Mode 2]

There are provided an intake valve and an exhaust valve assembled to a combustion chamber of an engine, a variable valve train that varies valve opening/closing operations of each of said valves, a mixture injection valve having a valve portion that can open to the combustion chamber, an air injection valve that injects compressed air into a mixing chamber of the mixture injection valve, a fuel injection valve that injects fuel into the mixing chamber of the mixture injection valve, and a throttle valve that regulates the amount of air supplied to the intake valve of the engine. With the exhaust gas left in the combustion chamber by adjusting a valve closing timing of the exhaust valve, a mixture formed in the mixing chamber within the mixture injection valve is injected through the valve portion, thereby forming an ignitable mixture in an area around an ignition plug of the engine.

[Mode 3]

A spiral groove is provided in an inner wall of the mixing chamber of the mixture injection valve. This promotes vaporization of fuel injected into the mixing chamber, helping expedite forming of the mixture.

[Mode 4]

A heater is provided in an area around a nozzle of the fuel injection valve that injects fuel into the mixing chamber of the mixture injection valve. This promotes vaporization of fuel injected into the mixing chamber, helping expedite forming of the mixture.

[Mode 5]

A material exhibiting a high thermal conductivity is used in an area around the valve portion at a leading edge of the mixing chamber of the mixture injection valve. As a result, heat conduction from the combustion chamber or the exhaust passage increases the temperature at the area around the valve portion on the leading edge of the mixing chamber. This promotes vaporization of fuel injected into the mixing chamber, helping expedite forming of the mixture.

[Mode 6]

There are provided at least one intake valve and at least one exhaust valve assembled to a combustion chamber of an engine, a variable valve train that varies valve opening/closing operations of the intake valve, a variable valve train that varies valve opening/closing operations of the intake valve, a variable valve train that varies valve opening/closing operations of the exhaust valve, at least one ignition plug, a mixture injection valve having a valve portion that can open to the combustion chamber, an air injection valve that injects compressed air into a mixing chamber of the mixture injection valve, a fuel injection valve that injects fuel into the mixing chamber of the mixture injection valve, and a throttle valve that regulates the amount of air supplied to the intake valve of the engine. When air to be drawn into the engine is supplied only through the mixture injection valve, the air-fuel ratio of the mixture injected from the mixture injection valve is set to the stoichiometric ratio. When air is also supplied through the intake valve, in addition to that supplied through the mixture injection valve, the air-fuel ratio of the mixture injected from the mixture injection valve is set to a value richer than the stoichiometric ratio.

Figure 1:
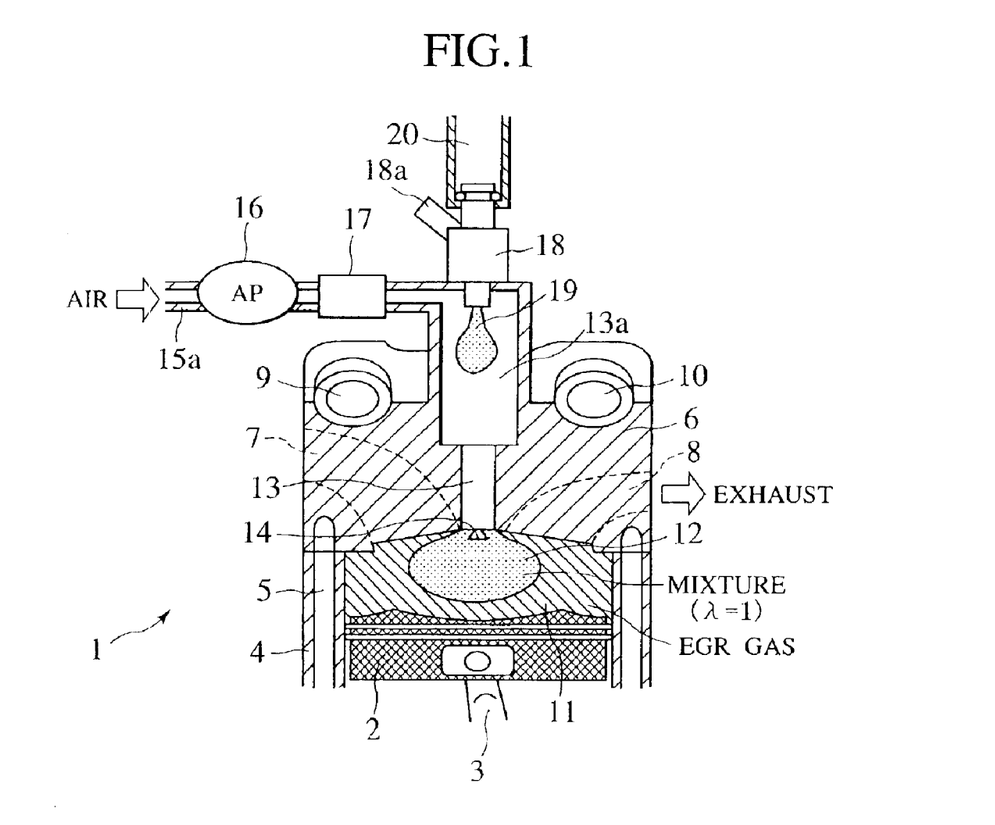
FIG. 1 is a cross-sectional view of an engine to which the present invention is applied.
Figure 2:
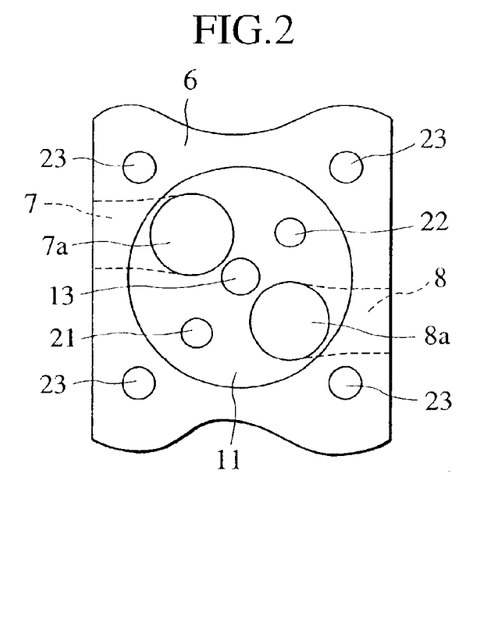
FIG. 2 is a bottom view of an engine head of the engine to which the present invention is applied.

Preferred embodiments of the present invention will be described with reference to FIGS. 1 through 19. FIGS. 1 and 2 are a cross-sectional view of an engine to which the present invention is applied and a bottom view of an engine head 6 of the engine, respectively. An engine 1 is a four-cycle engine that performs four strokes of intake, compression, power, and exhaust per two-reciprocating motions of a piston 2. Air supplied to the engine 1 passes through an intake passage 15a and is compressed by an air pump 16. A driving force provided by the engine 1 drives the air pump 16. The air pump 16 is provided therein with a built-in pressure regulating mechanism that maintains a predetermined pressure value. An air injection valve 17 injects compressed air into a mixing chamber 13a at a predetermined timing based on a command issued by an engine control unit not shown. Fuel supplied to the engine 1 is, on the other hand, compressed by a fuel pump not shown and then passes through a fuel passage 20. The fuel is thereafter injected through a fuel injection valve 18 into the mixing chamber 13a at a predetermined timing based on a command issued by the engine control unit not shown. The injected fuel vaporizes and is mixed with the compressed air in the mixing chamber 13a. A mixture injection valve 13 is provided with a valve 14 that opens outwardly (hereinafter referred to as an "outwardly opening valve") at a leading edge thereof. The outwardly opening valve 14 is normally pushed in a valve closing direction by a spring. When compressed air is injected by the air injection valve 17, a pressure inside the mixing chamber 13a builds up. Then, a force acts on a valve seat portion of the outwardly opening valve 14 in a valve opening direction. When the force overcomes a force of the spring, the outwardly opening valve 14 leaves the valve seat, allowing a mixture 12 to be injected. Part of an exhaust gas (hereinafter referred to as an EGR gas) that burns in a preceding cycle is left inside a combustion chamber 11. The mixture 12 injected from the center of the combustion chamber 11 stagnates at the central portion in the combustion chamber 11, without being widely dispersed therein. According to the present embodiment, there are provided one intake valve and one exhaust valve, and the mixture injection valve 13 is provided with two ignition plugs 21 and 22 at the central portion of the combustion chamber as shown in FIG. 2. Providing a plurality of ignition plugs offers effects, such as increasing an opportunity of ignition and a combustion speed, and improving robustness against an unevenly present mixture. The layout of the engine, to which the present invention is applied, is not, however, limited to the example shown heretofore. The invention is applicable to a currently common engine configuration having two intake valves, two exhaust valves, and one ignition plug.

Figure 3A:
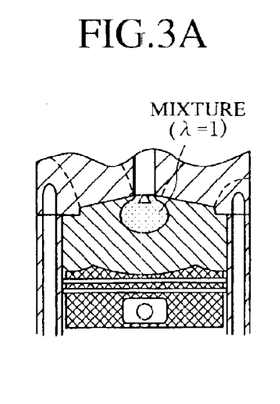
FIGS. 3A, 3B, and 3C, is a schematic diagram showing different mixture forming methods as applied under varying engine loads according to the invention.
Figure 3B:
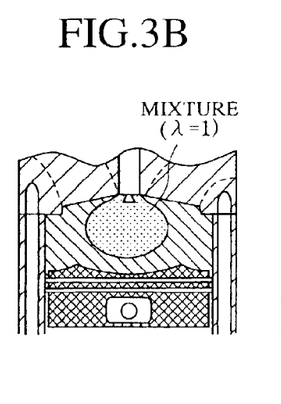
Figure 3C:
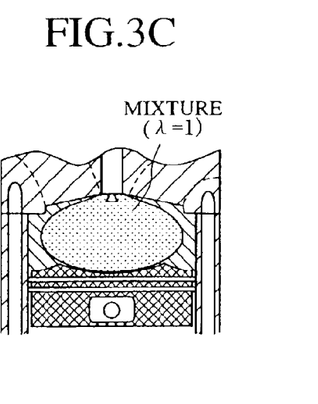

FIG. 3, comprising FIGS. 3A, 3B, and 3C, shows conditions of the mixture 12 under varying engine loads. Under a light load condition, the EGR gas occupies a good part of a volume of the combustion chamber. The amount of mixture injected is small and therefore the volume of the mixture 12 is small. With the load becoming heavier, the amount of mixture injected increases and thus the volume of the mixture 12 becomes greater. Then, the amount of the EGR gas decreases accordingly. The combustion chamber is, however, filled with the EGR gas at all times before the mixture is injected. There is therefore formed an EGR gas layer on a cylinder wall surface and near a piston top and the mixture is formed therein. In addition, the mixture injected is set to the stoichiometric air-fuel ratio, with fuel having been sufficiently vaporized and mixed with air in the mixing chamber of the mixture injection valve. This eliminates the need for conventional processes (atomizing fuel, vaporizing fuel, and mixing fuel with air) for forming the mixture in the combustion chamber. This in turn eliminates the possibility of fuel components in states of droplets or film of liquid fuel sticking to the cylinder wall surface and piston top, thus reducing the amount of HC emissions.

The point about the present invention is, for one, that the mixture set to a combustible air-fuel ratio is formed in an ambience filled with the EGR gas in the combustion chamber 11. For another, the volume of the mixture increases in accordance with the engine load.

Figure 4:
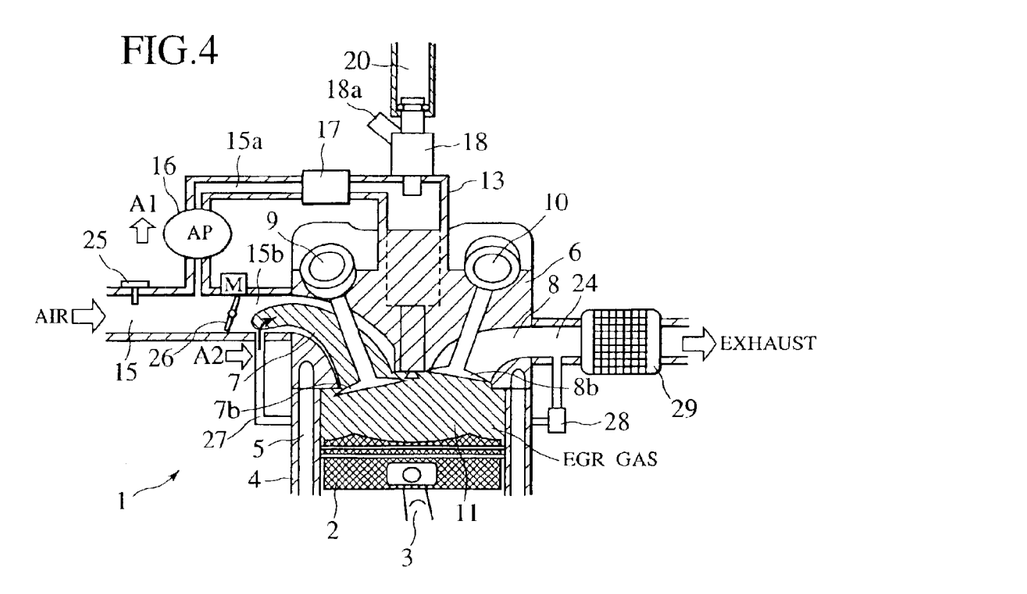
FIG. 4 is a view showing an engine configuration (an external EGR system) according to a first embodiment of the present invention.
Figure 5:
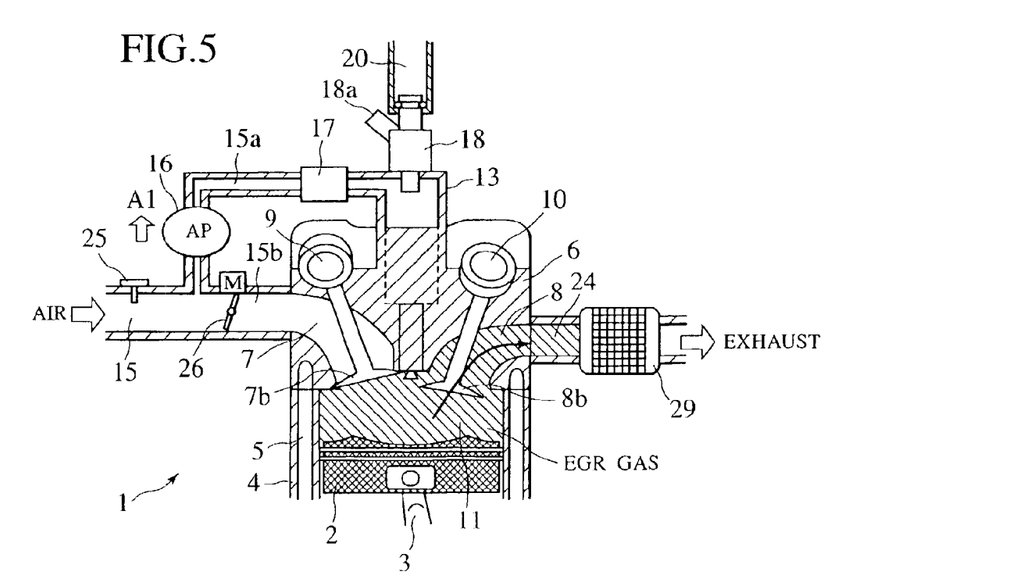
FIG. 5 is a view showing an engine configuration (an internal EGR system) according to a second embodiment of the present invention.

A method for introducing the EGR gas into the combustion chamber of the engine 1 will be explained. FIG. 4 shows a preferred embodiment according to an external EGR system, while FIG. 5 shows a preferred embodiment according to an internal EGR system. Referring to FIG. 4, air drawn into the engine passes through an intake passage 15 and an air flow sensor 25 measures the amount of air drawn in. When the engine load is smaller than a predetermined value, a throttle valve 26 controlled so as to be in a fully closed position. In this condition, an entire amount of the air that has passed through the intake passage 15 flows into a side of an air pump 16 (indicated by A1 in FIG. 4). When the engine load exceeds the predetermined value, the amount of air with A1 only is not sufficient and thus the throttle valve 26 is controlled to open, thereby allowing a required amount of air (indicated by A2 in FIG. 4) to be supplied to the engine. FIG. 4 shows a condition, in which the load remains small and the throttle valve 26 is fully closed. The air that has passed through the intake passage 15 is compressed by the air pump 16 and moves past the intake passage 15a before being injected by the air injection valve 17 into the mixing chamber 13a. The fuel injected from the fuel injection valve 18 is mixed with the compressed air in the mixing chamber to form a mixture.

Since the throttle valve 26 is fully closed during an intake stroke of the engine, a vacuum develops inside an intake port 7. When an EGR control valve 28 is then controlled so as to be opened, the exhaust gas flows from an exhaust port 24 to the intake port 7, thus allowing the EGR gas into the combustion chamber 11. During the intake stroke, therefore, only the EGR gas is supplied into, and fills, the combustion chamber. In a latter half part of the intake stroke thereafter, the mixture injection valve 13 injects the mixture in the mixing chamber 13a. The amount of the mixture to be injected is the sum of the amount of the air and that of the fuel injected from the air injection valve 17 and the fuel injection valve 18, respectively, according to control signals provided by the engine control unit not shown. The amount is adjusted so as to provide the stoichiometric air-fuel ratio.

Referring to FIG. 5, the operation of the air drawn into the engine is the same as that of FIG. 4. FIG. 5 shows a condition, in which the engine load remains small and the throttle valve 26 is fully closed. The entire amount of the air that has passed through the intake passage 15 flows into the side of the air pump 16. The air is compressed by the air pump 16, moves past the intake passage 15a, and is injected into the mixing chamber 13a by the air injection valve 17. The fuel injected from the fuel injection valve 18 is mixed with the compressed air in the mixing chamber to form a mixture.

Figure 6:
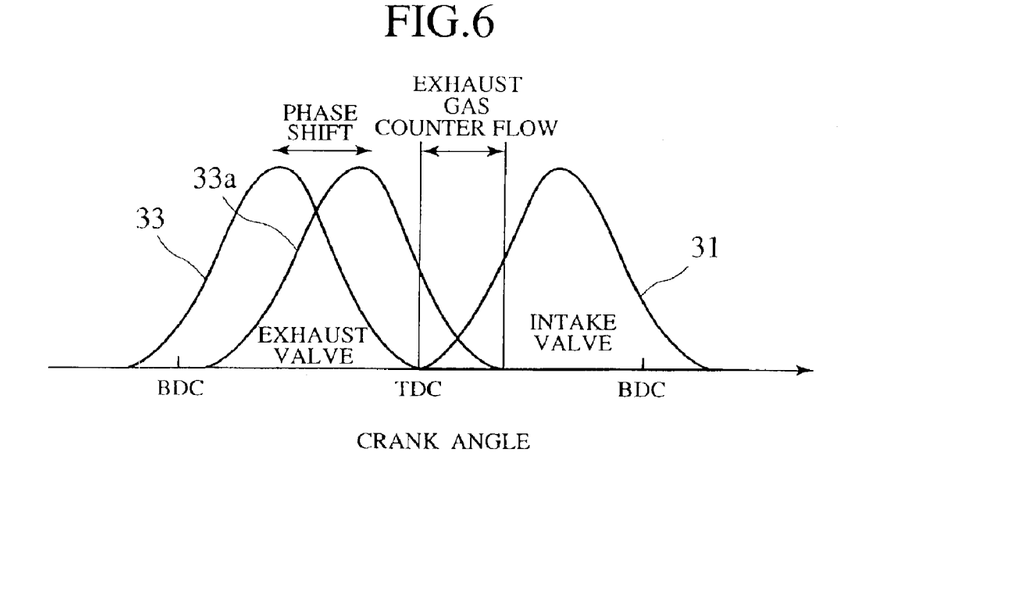
FIG. 6 is a diagram illustrating the operation of an intake valve and an exhaust valve of the engine according to the second embodiment of the present invention.

The internal EGR system uses the exhaust gas burned in a preceding cycle. FIG. 6 shows a lift curve of a phase shifting type variable valve. When the phase of the lift curve of the exhaust valve is shifted as shown from a lift curve 33 to a lift curve 33a, there is produced a period, during which a lift curve 31 of the intake valve overlaps, near the top dead center (indicated by TDC in FIG. 6). Both the intake valve and the exhaust valve are open at the same time during this period, which causes a phenomenon to occur, in which the exhaust gas flows from an exhaust pipe back toward an intake pipe. If the phase of the exhaust valve is retarded as shown by the curve 33a, however, it also retards the timing, at which the exhaust valve opens, possibly extending into the exhaust stroke. There is therefore a limit to the amount of phase shift allowed for the exhaust valve, which hampers introduction of a large amount of the EGR gas.

Figure 7:
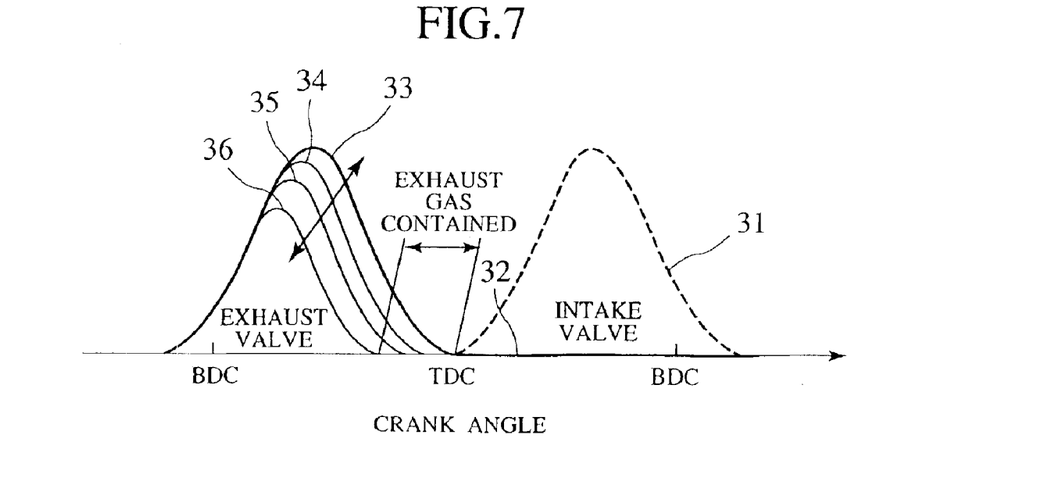
FIG. 7 is a diagram illustrating the operation of the intake valve and the exhaust valve of the engine according to the second embodiment of the present invention.

FIG. 7 shows an approach, in which the lift curve of the exhaust valve is shifted from the lift curve 33 to a lift curve 36. According to this approach, the exhaust valve is closed in the middle of the exhaust stroke, thereby leaving the EGR gas behind in the combustion chamber. In this case, it is possible to adjust the amount of the exhaust gas left contained by varying the timing, at which the exhaust valve is closed. The intake valve ordinarily operates as shown by a lift curve 31. In the condition shown in FIG. 5, however, the intake valve does not perform an opening operation, keeping the condition shown by 32. There is a small amount of air leaking even when the throttle valve 26 is in the fully closed position. Air containing an oxygen component is therefore present inside the intake port 7. If the intake valve 7b is opened during the intake stroke, the air present inside the intake port 7 enters the combustion chamber 11, causing the air-fuel ratio to change. It is therefore desirable that a variable valve mechanism that can make the valve lift zero according to operating conditions be provided for the intake valve 7b or a camshaft 9. In the latter half part of the intake stroke, the mixture injection valve 13 injects the mixture in the mixing chamber 13a into the EGR gas left inside the combustion chamber 11. The amount of the mixture to be injected is the sum of the amount of the air and that of the fuel injected from the air injection valve 17 and the fuel injection valve 18, respectively, according to control signals provided by the engine control unit not shown. The amount is adjusted so as to provide the stoichiometric air-fuel ratio.

Figure 8:
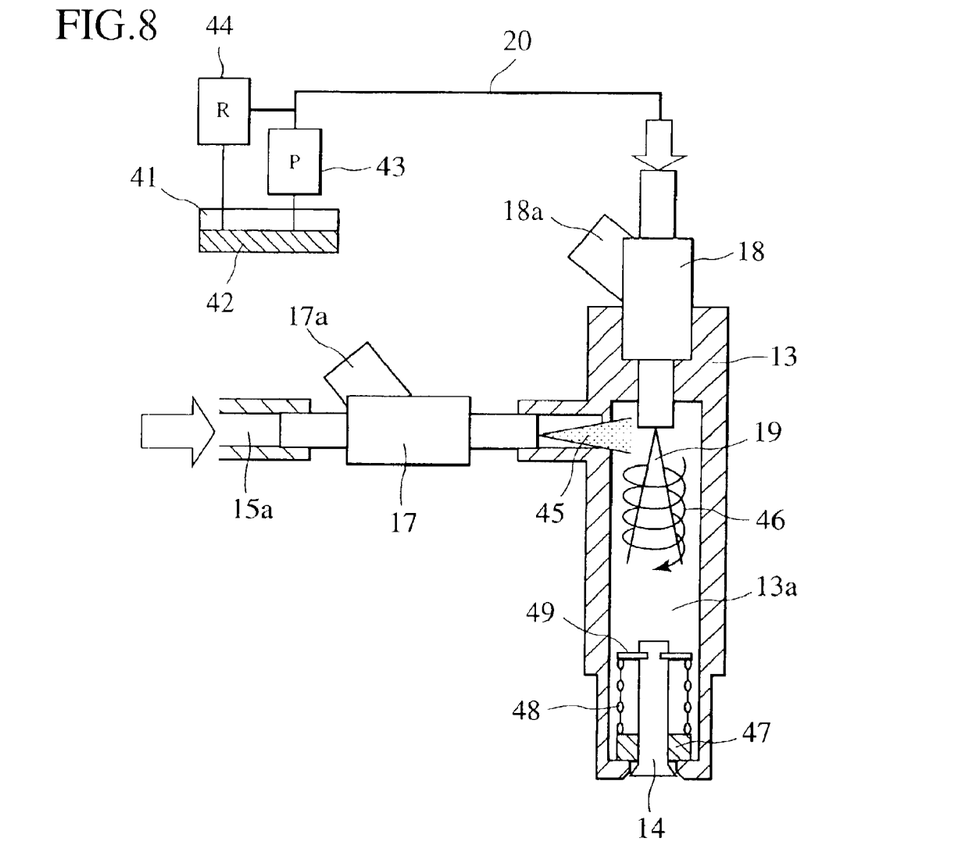
FIG. 8 is a cross-sectional view showing a construction of a mixture injection valve.

The construction of the mixture injection valve will be described. FIG. 8 is a cross-sectional view showing the mixture injection valve. A fuel pump 43 pressurizes fuel 42 in a fuel tank 41. The pressure of the pressurized fuel is regulated by a regulator 44 to a predetermined fuel pressure and the fuel 42 is then supplied to the fuel injection valve 18. A control signal from the engine control unit not shown is applied to a terminal 18a of the fuel injection valve 18. The fuel injection valve 18 then injects the fuel at an injection timing according to the control signal. The air is compressed by an air pump not shown before being supplied through the intake passage 15a to the air injection valve 17. A control signal from the engine control unit not shown is applied to a terminal 17a of the air injection valve 17. The air injection valve 17 then injects the air at an injection timing according to the control signal.

Figure 9:
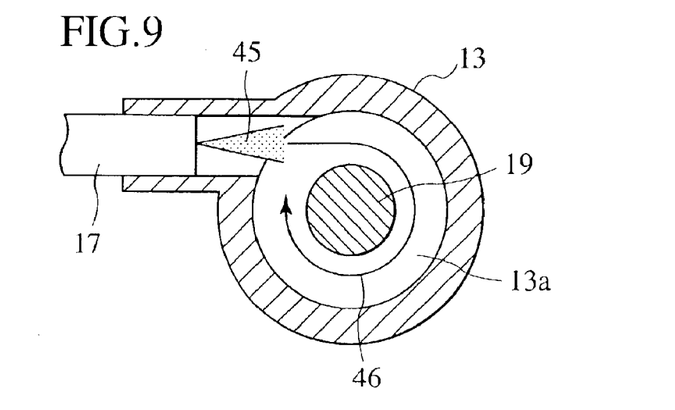
FIG. 9 is a horizontal sectional view showing the mixture injection in a plane including an air injection valve.

FIG. 9 is a horizontal sectional view of the mixture injection 13 in a plane including the air injection valve 17. The point of injection of the compressed air is set so as to offset from a centerline of the mixing chamber 13a. Air 45 is thus given a spiral swirl so as to enclose a fuel spray 19 inside the mixing chamber 13a. When the injection of air further continues, the pressure in the mixing chamber 13a builds up, resulting in a force acting in a valve opening direction on a valve seat portion of the outwardly opening valve 14. When this force then overcomes the force of a spring 48, the outwardly opening valve 14 opens.

Figure 10:
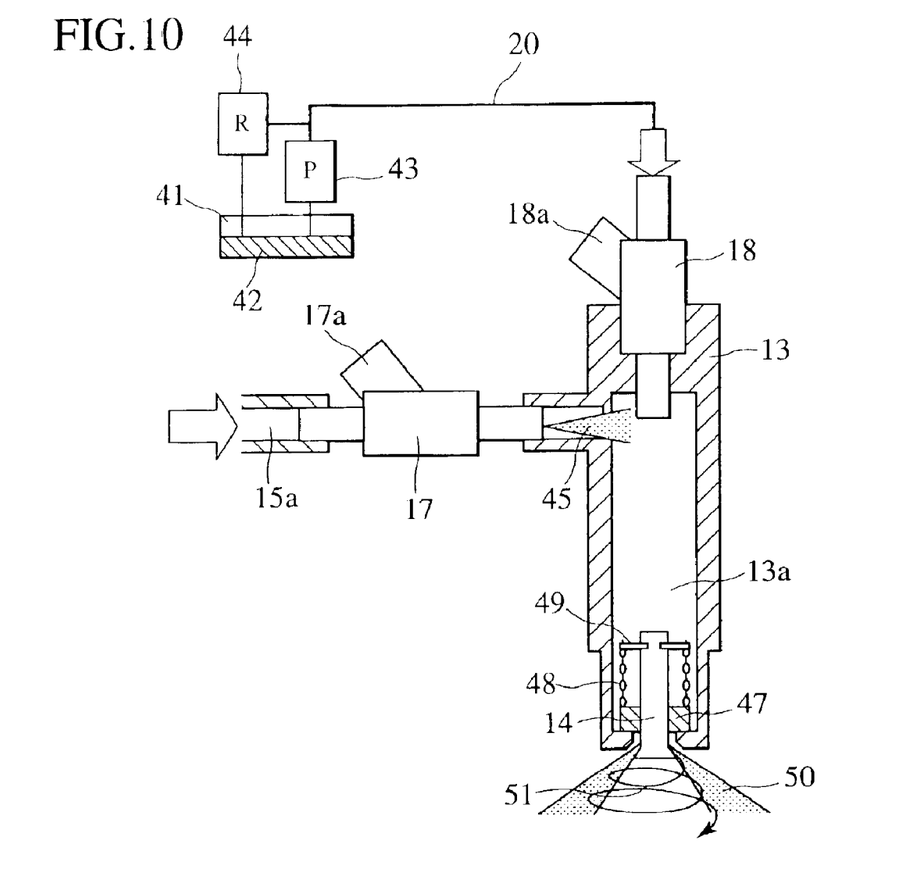
FIG. 10 is a cross-sectional view showing a construction of the mixture injection valve.

FIG. 10 is a cross-sectional view of the mixture injection valve during an injection operation. A swirl element 47 that gives the mixture a swirl force is provided at a position near the leading edge of the mixture injection valve. The swirl element 47 gives a mixture 50 to be injected a swirl force as shown by an arrow 51. As a result, the mixture 50 is favorably mixed with a surrounding air even after it has been injected, thus preventing uneven concentration of the mixture from developing. If there is uneven concentration in the mixture, the combustion temperature increases partly, which could aggravate the exhaust gas.

Figure 11:
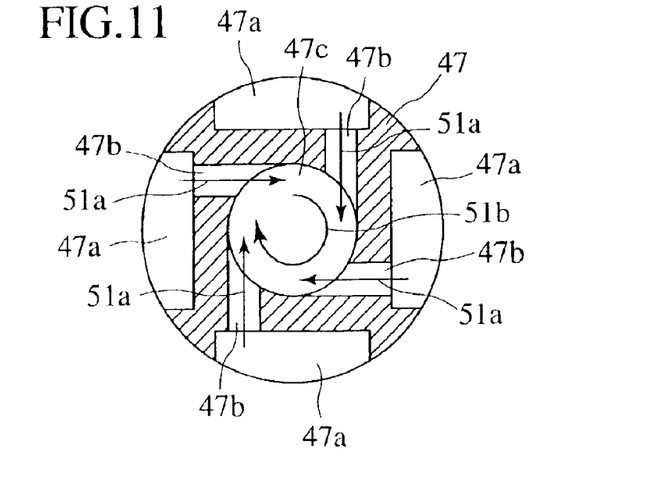
FIG. 11 is a cross-sectional view showing a swirl element built into the mixture injection valve.

FIG. 11 shows the construction of the swirl element 47. The mixture in the mixing chamber 13a passes through supply ports 47a and then through swirl grooves 47b. Each of the swirl grooves 47b is designed to approach a swirl chamber 47c by way of a tangential direction. As a result, a swirl as indicated by an arrow 51b is produced in the swirl chamber 47c. The strength of the swirl 51b can be varied depending on the shape and position of the swirl grooves 47b. The swirl element 47 functions also as a guide for the outwardly opening valve 14 during a valve opening/closing operation thereof, preventing the valve 14 from deviating eccentrically.

Figure 12:
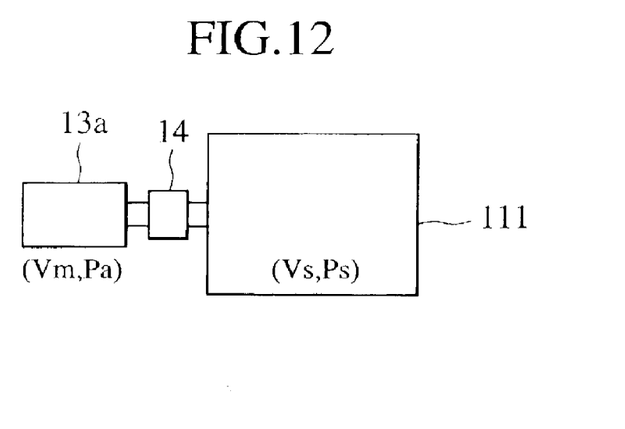
FIG. 12 is a diagram showing the relationship between a mixing chamber volume and a piston displacement volume.

FIG. 12 shows the relationship between a mixing chamber volume Vm and a piston displacement volume Vs. With a naturally aspired engine, the amount of mixture to be supplied to the engine combustion chamber is equivalent to a maximum of the piston displacement volume Vs, if the intake pressure is 1 atm. Since it is necessary that the mixing chamber of the mixture injection valve temporarily store therein the amount of mixture equivalent to Vs, the following equation holds true.

$$Vm = Vs/Pa \tag{1}$$

Where, the volume of the mixing chamber of the mixture injection valve is Vm, the piston displacement volume Vs, and the compressed air pressure Pa.

FIG. 12 schematically shows the mixing chamber 13a and the combustion chamber 11, each being isolated from each other by the outwardly opening valve 14. When the outwardly opening valve 14 opens, there is established equilibrium between the mixing chamber 13a and the combustion chamber 11. Hence, the equation (1) holds. The volume of the mixing chamber 13a can therefore be calculated using the equation (1). In addition, if the volume of the mixing chamber Vm is larger than necessary, it takes time to fill the mixing chamber with the mixture, resulting in poorer response. It is therefore desirable that the volume of the mixing chamber Vm be less than the value obtained from the equation (1).

Figure 13:
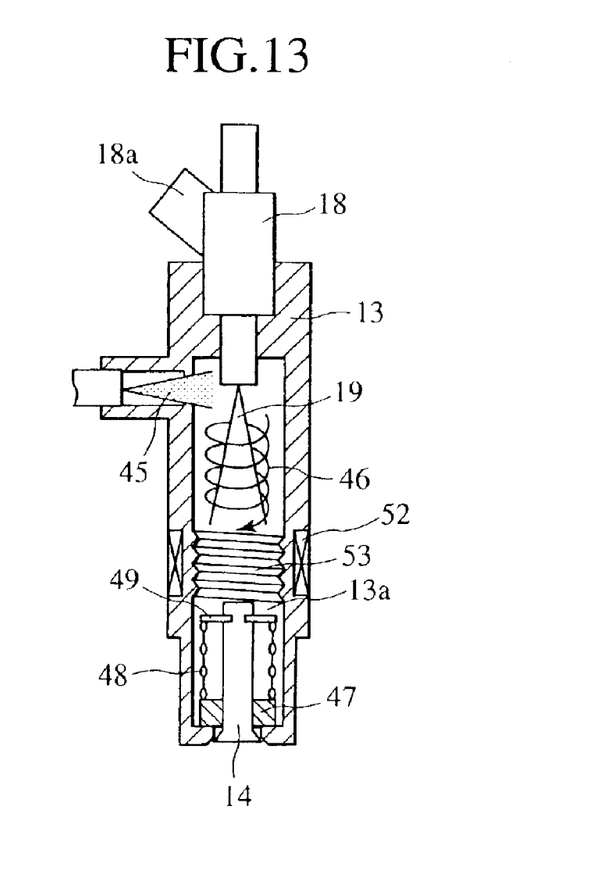
FIG. 13 is a view showing an arrangement for promoting vaporization in the mixing chamber.
Figure 14:
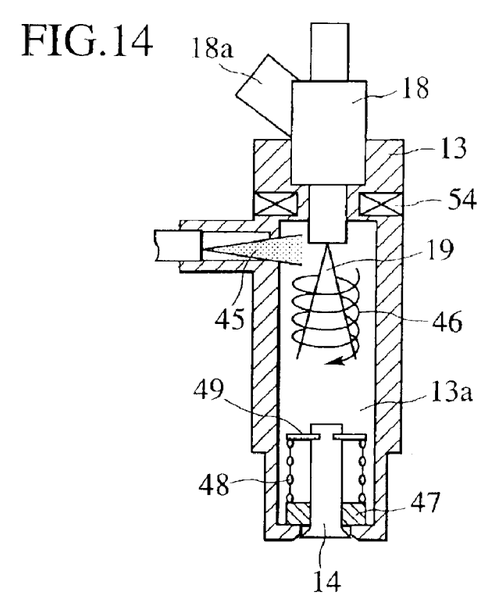
FIG. 14 is a view showing an arrangement for promoting vaporization in the mixing chamber.
Figure 15:
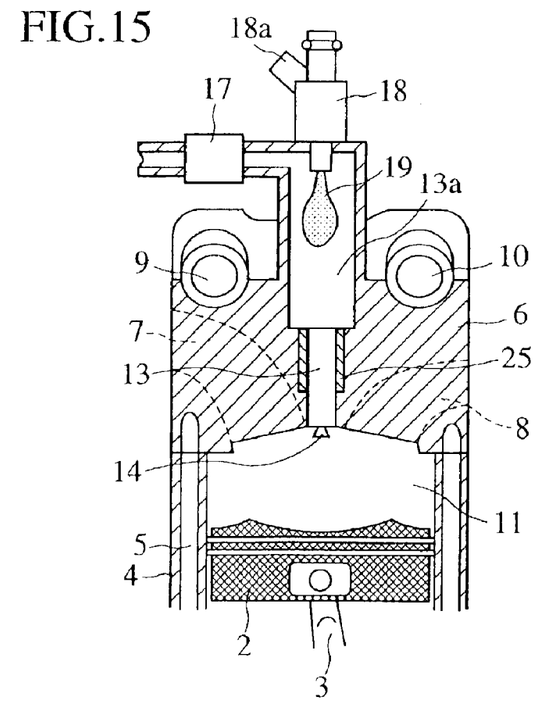
FIG. 15 is a view showing an arrangement for promoting vaporization in the mixing chamber.

A method for promoting vaporization in the mixture injection valve will be described. FIG. 13 shows an arrangement in which a spiral groove 53 is provided in the mixing chamber 13a. The spiral groove 53 is disposed at a portion near an area to which injected fuel sticks. There is provided a heater 52 so as to surround the spiral groove 53. The area surrounding the spiral groove 53 is heated by heat generated by the heater 52. The spiral groove 53 is shaped to have a greater surface area so that the groove remains in contact with fuel for a longer period of time. FIG. 14 shows an arrangement in which a heater 54 is disposed at a portion near a nozzle of the fuel injection valve 18. A sufficient vaporization promotion effect can be obtained if the leading edge of the nozzle is heated to a temperature of about 90° C. or more. FIG. 15 shows an arrangement in which a material 55 having a high thermal conductivity is disposed at a portion near an area where the engine head 6 is in contact with the mixture injection valve 13. In this arrangement, the mixture injection valve is heated by heat transferred from the combustion chamber and the exhaust port to promote vaporization.

Figure 16:
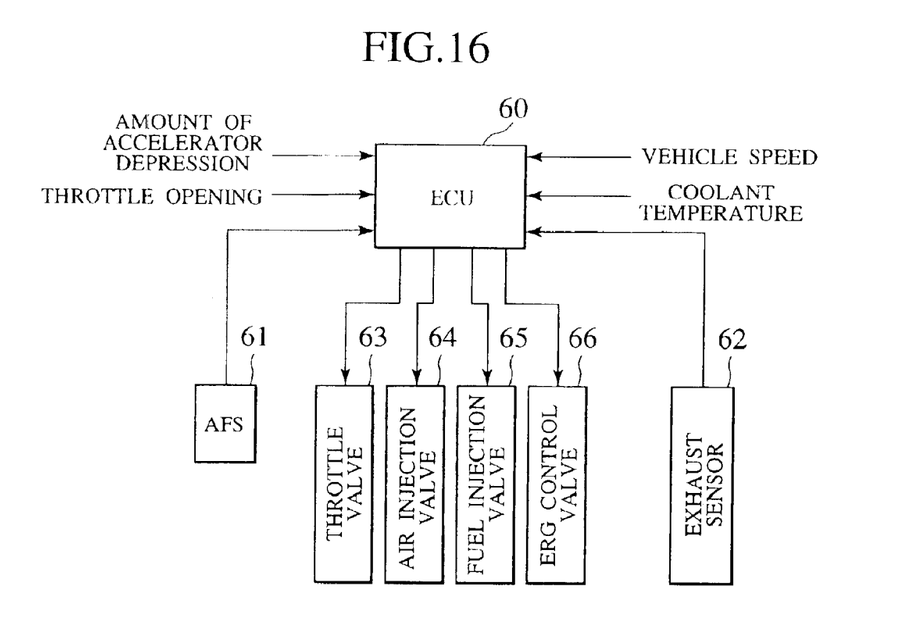
FIG. 16 is a schematic diagram showing components of an engine system according to the present invention.

An engine control method according to the embodiment will be described. FIG. 16 is a schematic diagram showing components of an engine system according to the embodiment. An engine control unit 60 determines operating conditions of the engine based on signals provided by various types of sensors. For example, an air flow sensor signal processing unit 61 measures the amount of air drawn into the engine and produces an output of a corresponding signal. An exhaust sensor signal processing unit 62 measures an oxygen concentration in the exhaust gas and produces an output of a corresponding signal. Based on these signals, the engine control unit 60 provides outputs of control signals to drive the associated actuators. For example, the engine control unit 60 transmits a control signal to a control unit 63 for the throttle valve or a control unit 64 for the air injection valve to control the amount of air. Alternatively, the control unit 60 sends a control signal to a control unit 65 for the fuel injection valve to control fuel injection and to a control unit 66 for the EGR control valve to control the amount of EGR gas.

Figure 17:
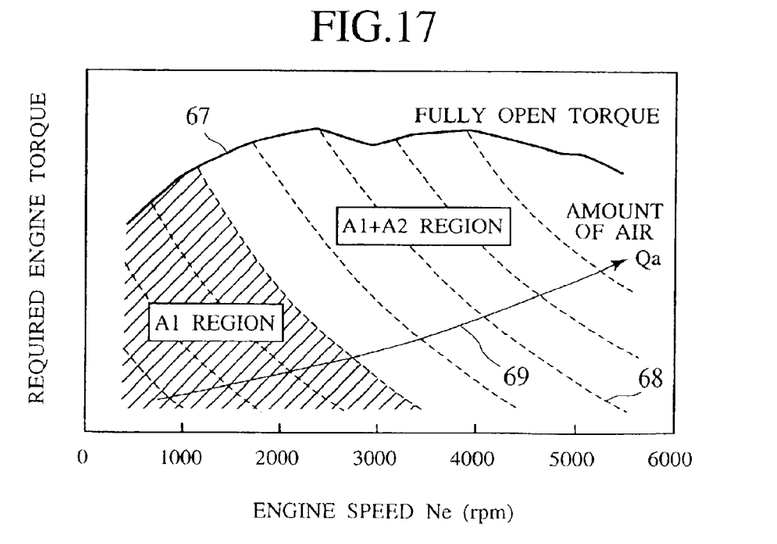
FIG. 17 is a diagram showing a map of the amount of intake air for the engine embodying the present invention.

FIG. 17 is a diagram showing a map of the amount of the engine intake air. The horizontal axis represents an engine speed, while the vertical axis represents a required engine torque. The engine speed is calculated using a speed sensor and the required engine torque is calculated based on the amount of accelerator pedal depression, a vehicle speed, and the like. Referring to FIG. 17, a solid line 67 represents engine torque when the throttle valve is fully opened and a broken line 68 represents an equivalent amount of air curve. An amount of intake air Qa increases as shown by an arrow 69. With an engine to which the mixture injection valve according to the present invention has been applied, the entire amount of intake air is supplied from the mixture injection valve without fresh air being supplied from the intake valve in a region with a small amount of intake air (a region A1 in FIG. 17). In a region having an increased amount of intake air (a region A1+A2 in FIG. 17), on the other hand, the mixture and fresh air are supplied from the mixture injection valve and the intake valve, respectively. To perform homogeneous combustion, therefore, the air-fuel ratio of the mixture supplied from the mixture injection valve is enriched to compensate for the amount of fresh air supplied from the intake valve in the region A1+A2, thereby ensuring that the air-fuel ratio of the mixture in the entire combustion chamber is the stoichiometric air-fuel ratio. It is to be noted that, in the region A1, the air-fuel ratio of the mixture supplied from the mixture injection valve is set to the stoichiometric ratio of 14.7. The control unit for controlling the amount of air in the engine control unit 60 controls the actual amount of air using the mixture injection valve (A1) and the throttle valve (A2) in accordance with the required amount of air. The mixture injection valve (A1) is, however, preferentially used.

Figure 18:
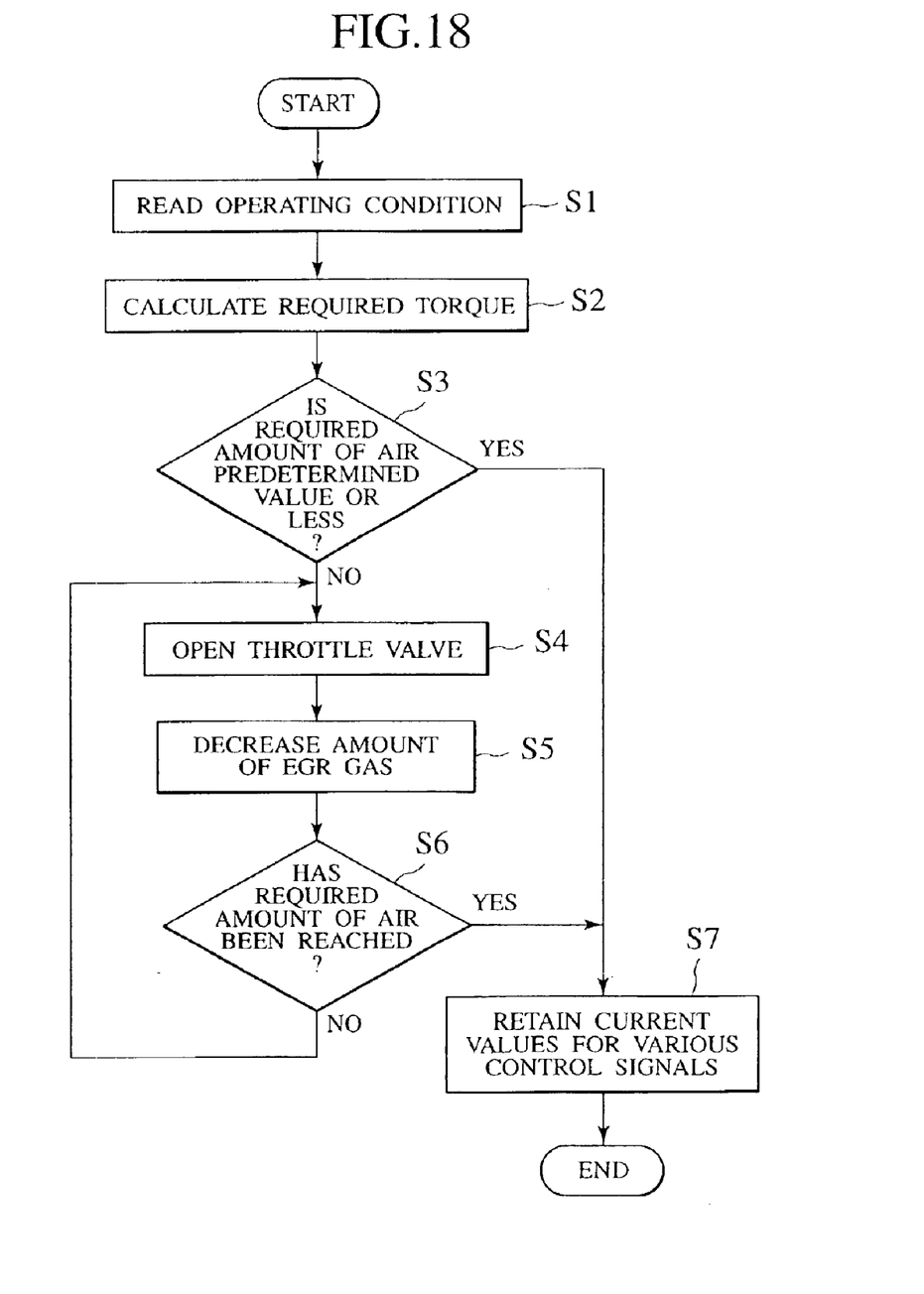
FIG. 18 is a flowchart showing the control provided for switching from an A1 region to an A1+A2 region according to the external EGR system.

FIG. 18 shows a control flowchart for the external EGR system. In step 1 (S1 in FIG. 18), the engine control unit (ECU) 60 reads output signals from the various types of sensors. The ECU then determines the operating conditions of the engine based on the information provided with these signals and calculates the required engine torque in step 2. In step 3, the ECU calculates the required amount of air using a map of the amount of air such as the map shown in FIG. 17 and determines whether the required amount of air is a predetermined value (for example, a designed amount of air or a permissible amount of air of the mixture injection valve) or less. The map of the amount of air is previously stored in the ECU 60. If the required amount of air is the predetermined value or less, the operation proceeds to step 7 and the ECU does not change, and retains, current values of the various control signals, thus completing the switching control procedure. On finding in step 3 that the required amount of air exceeds the predetermined value, the ECU controls the throttle valve so that it moves in the valve opening direction in step 4, thereby increasing the amount of air taken in through the intake valve. In step 5, the ECU decreases the amount of the EGR gas in accordance with the increased amount of air. In the external EGR system, the amount of the EGR gas is adjusted using an EGR control valve. In step 6, the ECU determines whether or not the output signal from the air flow sensor signal processing unit 61 (an actual amount of air) indicates that the required amount of air has been reached. If the ECU finds that the actual amount of air still falls short of the required amount of air, the ECU returns to step 4 and controls the throttle valve so that it moves further in the valve opening direction. If the ECU finds in step 6 that the actual amount of air has reached the required amount of air, the ECU proceeds to step 7 and does not change, and retains, the current values of the various control signals, thus completing the switching control procedure. This switching control logic is stored in the ECU 60 and called up from a main control logic and executed as may be necessary.

Figure 19:
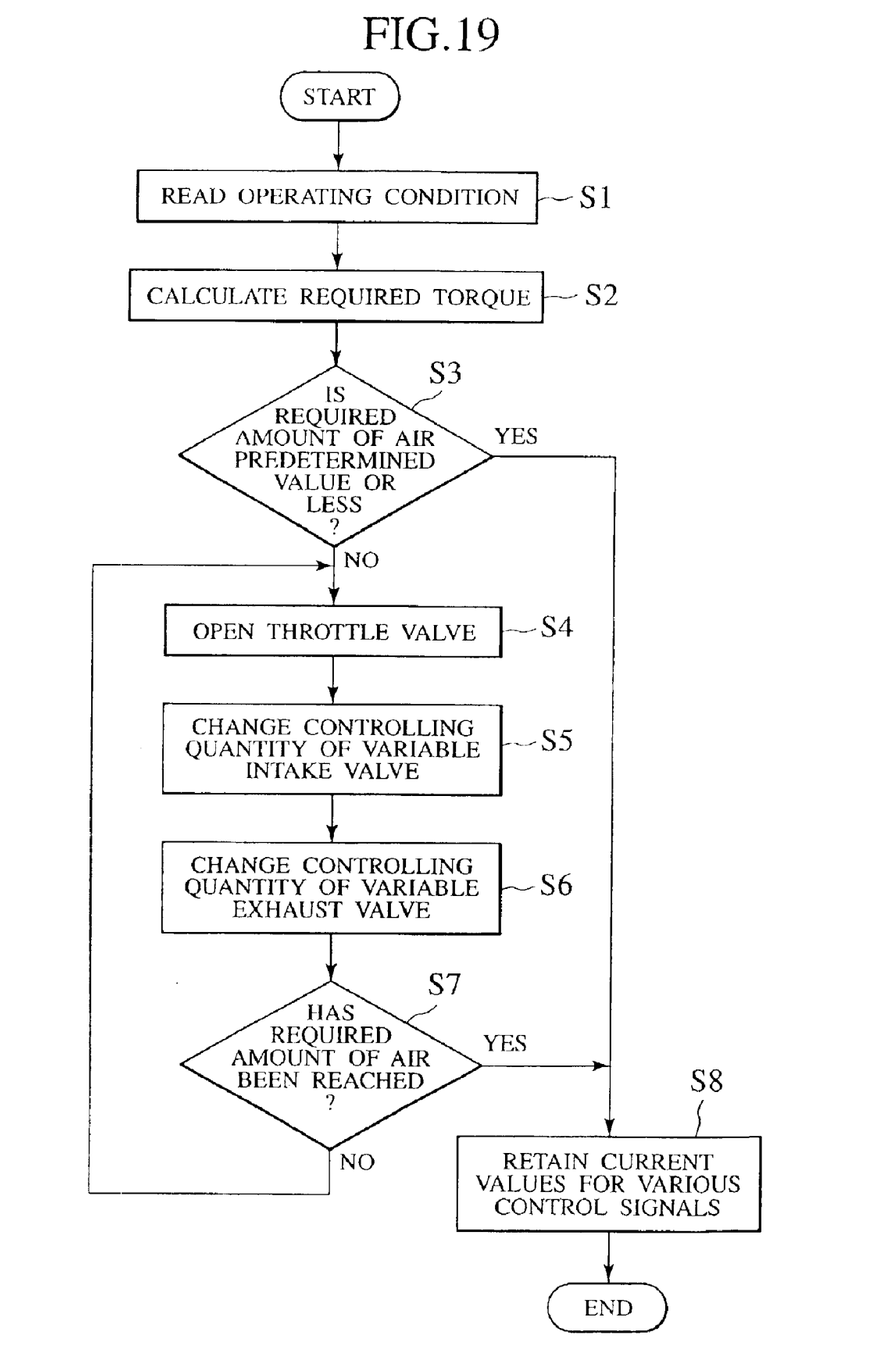
FIG. 19 is a flowchart showing the control provided for switching from an A1 region to an A1+A2 region according to the internal EGR system.

FIG. 19 shows a control flowchart for the internal EGR system. In step 1 (S1 in FIG. 19), the engine control unit (ECU) 60 reads output signals from the various types of sensors. The ECU then determines the operating conditions of the engine based on the information provided with these signals and calculates the required engine torque in step 2. In step 3, the ECU calculates the required amount of air using a map of the amount of air such as the map shown in FIG. 17 and determines whether the required amount of air is a predetermined value (for example, a designed amount of air or a permissible amount of air of the mixture injection valve) or less. The map of the amount of air is previously stored in the ECU 60. If the required amount of air is the predetermined value or less, the operation proceeds to step 8 and the ECU does not change, and retains, current values of the various control signals, thus completing the switching control procedure. On finding in step 3 that the required amount of air exceeds the predetermined value, the ECU controls the throttle valve so that it moves in the valve opening direction in step 4. In addition, in step 5, the ECU changes the lift curve of the intake valve, thereby increasing the amount of air taken in through the intake valve. In step 6, the ECU decreases the amount of the EGR gas in accordance with the increased amount of air. In the internal EGR system, the amount of the EGR gas is adjusted based on the valve closing timing of the exhaust valve. In step 7, the ECU determines whether or not the output signal from the air flow sensor signal processing unit 61 (an actual amount of air) indicates that the required amount of air has been reached. If the ECU finds that the actual amount of air still falls short of the required amount of air, the ECU returns to step 4 and controls the throttle valve so that it moves further in the valve opening direction. If the ECU finds in step 7 that the actual amount of air has reached the required amount of air, the ECU proceeds to step 8 and does not change, and retains, the current values of the various control signals, thus completing the switching control procedure. This switching control logic is stored in the ECU 60 and called up from a main control logic and executed as may be necessary.

In a system that prepares in advance the mixture and directly supplies the mixture to the direct injection engine using the mixture injection valve, the process, in which the mixture is formed in the combustion chamber, is not required, which contributes to an increased degree of freedom in combustion control. As is described in detail in the foregoing, according to the present invention, the combustion chamber is filled with the EGR gas before the mixture is injected and the amount of mixture variable in accordance with varying loads is injected into this combustion chamber. This effectively prevents fuel components in states of droplets or film of liquid fuel from sticking to the cylinder wall surface and piston top, thus reducing the amount of HC emissions. In addition, an end gas on an end of the combustion chamber is decreased, which suppresses occurrence of detonation, thus providing a high compression ratio for the engine. Furthermore, since the injected mixture is enclosed by the EGR gas, the air-fuel ratio of the region of combustion is maintained at the stoichiometric ratio. This makes it possible to maintain a high combustion speed despite a large amount of EGR combustion involved. An air flow in the combustion chamber, such as tumble or swirl, is therefore not necessary, eliminating the need for providing an air flow generating mechanism in the intake port.

According to the present invention, a large amount of EGR is made possible without making combustion unstable, so that a direct injection type internal combustion engine offering a good fuel economy can be obtained.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A control apparatus for a direct injection internal combustion engine, comprising:
    an EGR gas filling component that first fills a cylinder with an EGR gas though an exhaust valve; and
    a mixture supplying component that is configured to supply a mixture of fresh air and fuel into the EGR gas already inside said cylinder;
    a first mechanism for controlling the amount of fresh air supplied to the cylinder though an intake valve;
    a second mechanism for controlling adjustability of another amount of fresh air supplied into the cylinder bypassing said intake valve; and
    a detector for detecting the amount of air supplied to said cylinder from said first and second mechanisms for controlling the amount of air.

2. The control apparatus for a direct injection internal combustion engine
    according to claim 1, wherein the EGR gas that first fills said cylinder is from a previous combustion cycle or through an exhaust valve; and
    said cylinder is arranged only thereafter to be supplied with a mixture of fresh air and fuel.

3. The control apparatus for a direct injection internal combustion engine
    according to claim 1, wherein said intake valve
    an operating parameter of the internal combustion engine is controlled in accordance with the amount of fresh air supplied to a cylinder in which the EGR gas is present in a desired amount.

4. The control apparatus according to claim 1, further comprising:
    an EGR gas filling component that first fills a cylinder with an EGR gas through an exhaust valve;
    a structure leaving the EGR gas in one of said cylinder and a combustion chamber; and
    a mixture supplying component that supplies a mixture of fresh air and fuel into the EGR gas inside said cylinder, wherein
    the mixture supplying component supplies fresh air and fuel into the EGR gas left in the structure.

5. A direct injection engine comprising:
    at least one intake valve disposed at an entrance to a combustion chamber;
    at least one exhaust valve disposed at an exit from the combustion chamber;
    at least one ignition plug mounted to the combustion chamber;
    a mixture injection valve that directly supplies said combustion chamber with a mixture of fuel and fresh air;
    a throttle valve that adjusts the amount of air fed to said intake valve; and
    an exhaust gas return passage that connects an exhaust passage located downstream of said exhaust valve and an intake passage located upstream of said intake valve;
    wherein said exhaust gas return passage providing communication between said throttle valve and said intake valve is configured to supply said combustion chamber with the exhaust gas introduced through said exhaust gas return passage, and said mixture injection valve is configured and operative to directly inject the mixture into said combustion chamber only after the combustion chamber has been filled with the exhaust gas to form a region of the mixture in an area around the ignition plug of said engine;
    wherein said mixture injection valve is provided with a mixing chamber that mixes fuel with fresh air, an air injection valve that injects compressed air into said mixing chamber, and a fuel injection valve that injects fuel into said mixing chamber.

6. The direct injection engine according to claim 5, wherein a volume Vm of said mixing chamber of said mixture injection valve is smaller than a value calculated using an equation (1) when a volume of the combustion chamber of said engine is Vs and a compressed air pressure is Pa:

$$Vm = Vs/Pa \qquad (1).$$

7. A direct injection engine comprising:
    at least one intake valve disposed at an entrance to a combustion chamber;
    at least one exhaust valve disposed at an exit from the combustion chamber;
    a valve driving mechanism that varies at least either an open/close timing or a stroke of said intake and exhaust valves;
    at least one ignition plug mounted to the combustion chamber;
    a mixture injection valve that directly supplies said combustion chamber with a mixture of fuel and fresh air; and
    a throttle valve that adjusts the amount of air supplied from said intake valve to said combustion chamber;
    wherein the valve close timing of said exhaust valve is first adjusted so as to leave an exhaust gas behind in said combustion chamber and only thereafter the mixture is directly injected from said mixture injection valve into said combustion chamber to form a region of the mixture in an area around the ignition plus of said engine;
    wherein said mixture injection valve is provided with a mixing chamber that mixes fuel with fresh air, an air injection valve that injects compressed air into said mixing chamber, and a fuel injection valve that injects fuel into said mixing chamber.

8. The direct injection engine according to claim 7, wherein said mixture injection valve is provided with a mixing chamber that mixes fuel with fresh air, an air injection valve that injects compressed air into said mixing chamber, and a fuel injection valve that injects fuel into said mixing chamber, and wherein a volume Vm of said mixing chamber of said mixture injection valve is smaller than a value calculated using an equation (1) when a volume of the combustion chamber of said engine is Vs and a compressed air pressure is Pa:

$$Vm = Vs/Pa \qquad (1).$$

* * * * *